United States Patent [19]

Ueda et al.

[11] Patent Number: 5,048,400
[45] Date of Patent: Sep. 17, 1991

[54] PRESSURE COOKER WITH SENSOR

[75] Inventors: Shigeki Ueda, Yamatokoriyama; Kaeko Nishimoto, Tenri; Ichiro Hori; Hitoshi Kurita, both of Yamatokoriyama; Mitsuo Akiyoshi, Nara, all of Japan

[73] Assignee: Matsushita Electric Industrial Co., Ltd., Osaka, Japan

[21] Appl. No.: 629,804

[22] Filed: Dec. 19, 1990

[30] Foreign Application Priority Data

| Dec. 22, 1989 [JP] | Japan | 1-333336 |
| Dec. 26, 1989 [JP] | Japan | 1-337157 |
| Jan. 22, 1990 [JP] | Japan | 2-13157 |
| May 8, 1990 [JP] | Japan | 2-118914 |

[51] Int. Cl.⁵ .......................... A23L 1/00; A47J 27/00
[52] U.S. Cl. .......................... 99/332; 99/331; 99/342; 99/403; 99/468; 126/374; 219/431; 219/441; 220/203; 220/316
[58] Field of Search .................. 99/331, 332, 326–328, 99/333, 330, 334, 335, 337, 338, 342, 403, 426, 468; 126/374, 388; 219/431–433, 441, 442, 10, 77, 438; 220/203, 316, DIG. 16

[56] References Cited

U.S. PATENT DOCUMENTS

| 2,369,932 | 2/1945 | Allen | 99/332 |
| 2,495,603 | 1/1950 | Ryan | 99/331 |
| 2,715,672 | 8/1955 | Barlow | 219/431 |
| 2,812,414 | 11/1957 | Weeks | 219/431 |
| 3,788,302 | 1/1974 | Malaney et al. | 126/374 |
| 3,790,391 | 2/1974 | Bolleter et al. | 99/332 |
| 3,876,385 | 4/1975 | Markus et al. | 220/316 X |
| 3,940,589 | 2/1976 | Tupper | 219/433 |
| 4,241,288 | 12/1980 | Aoshima et al. | 99/332 |
| 4,303,816 | 12/1981 | Goessler et al. | 219/10.77 |
| 4,381,438 | 4/1983 | Goessler et al. | 219/431 X |

Primary Examiner—Timothy F. Simone
Attorney, Agent, or Firm—Panitch Schwarze Jacobs & Nadel

[57] ABSTRACT

A pressure cooker with a humidity sensor or gas sensor, wherein a micro-computer reliably detects the point at which the internal pressure of a pressure cavity reaches a prescribed value by using this sensor by detecting the point at which a pressure control valve begins to operate and begins to discharge a large quantity of excess vapor or gas etc. from the pressure cavity to the outside, with a result which is equivalent to that of a direct measurement of the internal pressure with a pressure sensor, thereby attaining an accurate measurement without bringing the humidity or gas sensor into contact with the pressure cavity.

10 Claims, 8 Drawing Sheets

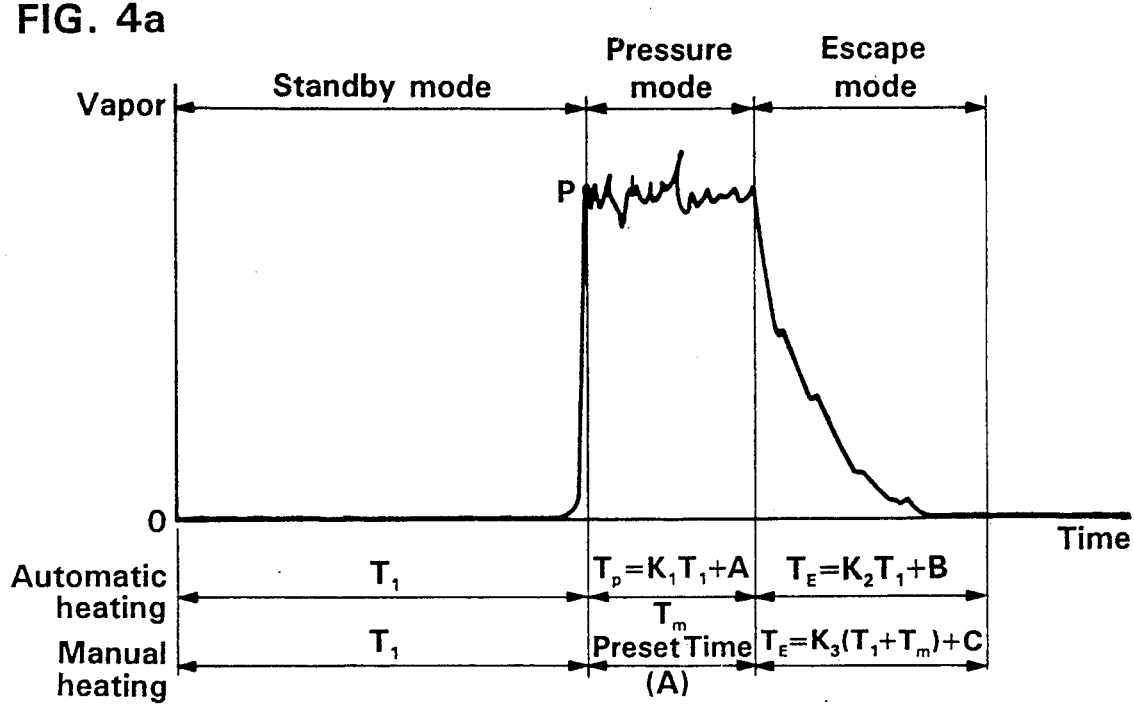
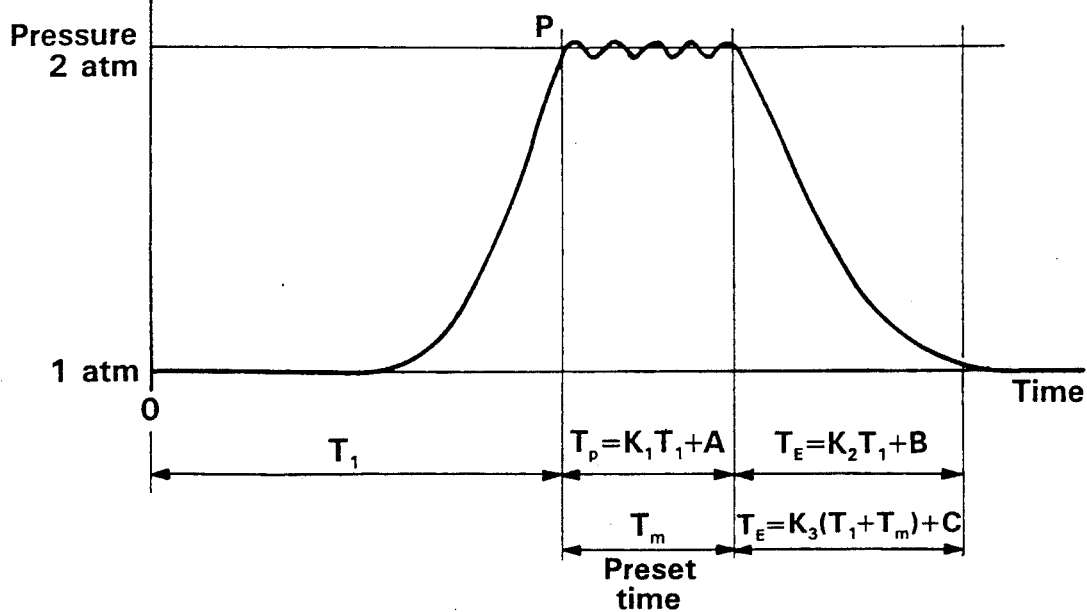

PRESSURE COOKER WITH SENSOR

BACKGROUND OF THE INVENTION

1. Field of the Invention

The present invention relates to a pressure cooker system, which cooks food under high pressure, the pressure cooker being constructed so that an electric power supply to a heating device is automatically controlled using a sensor.

2. Description of the Prior Art

There are pressure cookers in which the internal pressure from vapor generated from the food is raised and the boiling point is increased by tightly covering the food so that the heating time can be shortened.

Such pressure cookers have the following three heating modes. One is a standby mode, which is effective until a pressure control valve begins to operate shortly after the internal pressure of the pressure cooker increases due to a gradual rise in the temperature of the food after heating begins; the second is a pressure mode, which maintains a specific internal pressure while the pressure control valve is operating; and the third is an escape mode, which stops an electric power supply to the heating device and waits for the internal pressure to drop close to atmospheric pressure.

Of these heating modes, the most important heating mode having the greatest effect on the heating condition of the food is the pressure mode, which maintains a specific internal pressure. Heating times which are set forth in cook books that include with pressure cooking and the like for household use, are generally the times required for this pressure mode. Because the required times are short, failure may easily be caused if the times are not managed accurately.

However, since the standby time required for the standby mode differs depending upon factors such as the quantity of food and the calories of the heating device, a person operating the pressure cooker must constantly attend the cooker until the pressure control valve begins to operate, and must then start a timer into which the heating time is set, after confirming the point at which this operation began.

It is generally not necessary to operate the heating device at full power after the pressure mode has been reached. This avoids not only wasteful energy consumption, but also to cause the food to be unnecessarily agitated. Accordingly, when the pressure control valve begins to operate, it is also necessary for the person operating the pressure cooker to reduce the heat of the heating device to the minimum power at which the pressure control valve will operate.

To eliminate this kind of troublesome operation, there have been electric pressure cookers, the operability of which is improved by the use of a temperature sensor to detect the temperature of the cooker.

A control apparatus for electric pressure cooker as set forth in Japanese Laid-Open Patent Publication No. 63-9846, provides a thermal sensor joined to the bottom of a pressure cavity, and a thermal detecting device which outputs various control signals based upon signals from this device. When it is detected that the pressure cavity has attained a certain control temperature, a time switch operates, and electric power is reduced by turning the electricity to the heater off and on.

In other words, the heating time required for the pressure mode is preset with the time switch, and full power is applied during the standby mode. When the pressure cavity reaches a specified temperature, the time switch starts and the power is also automatically reduced. This means that the switching operation from the standby mode to the pressure mode is automatically performed by the control apparatus without constant attendance to the cooker.

A pressure cooker as set forth in Japanese Laid-Open Patent Publication No. 57-10264 is provided with a thermal detecting device which detects a drop in the internal pressure of a pressure cavity to atmospheric pressure, and it also performs a reporting by means of output from this device.

In other words, completion of the escape mode is detected by the temperature of the pressure cavity, and this is reported.

However, in either of the conventional cookers mentioned above, a thermal sensor detects the temperature of the pressure cavity's exterior surface, indirectly inferring the internal temperature, and therefore it is impossible to directly and accurately control the internal temperature of the cavity.

Since the heat conduction from the inside of the pot to the thermal sensor is delayed due to the thickness of the pot, the internal temperature exceeds the temperature to be controlled, and overshooting occurs. This kind of overshooting occurs to a rather large extent, particularly when the quantity of food is small, because the standby period is short.

Moreover, when foods like soup adheres to the contact area between the thermal sensor and the pot, the heat conduction becomes more difficult and the internal temperature increases, that is, the pressure rises. Hence, cooking does not proceed properly and there is an increase in danger.

Moreover, the operator must manually set the heating time using a timer while referring to the cook book etc. Although the timing operated by the timer is automatically controlled, heating is basically not automatic.

SUMMARY OF THE INVENTION

The pressure cooker with sensors of this invention, which overcomes the above-discussed and numerous other disadvantages and deficiencies of the prior art, comprises a pressure cavity which accommodates and seals up food; a pressure control valve provided in a portion of this pressure cavity; a heating chamber which accommodates the pressure cavity; a heating device combined with said heating chamber, said heating device heating the pressure cavity; a micro-computer which controls an electric power supply to said heating device; a humidity sensor, or gas sensor, which detects excess vapor discharged from the pressure control valve; and a timer means which sets a heating time for the period after the prescribed pressure is reached within the pressure cavity, wherein said micro-computer starts said timer means by detecting only a prescribed amount of excess vapor or gas discharged from said pressure control valve using said humidity sensor or gas sensor.

In an embodiment, the micro-computer reduces the electric power supply ratio to the heating device, from the point at which the humidity sensor, or gas sensor, detects the prescribed amount of excess vapor or gas discharged from the pressure control valve.

In an embodiment, the micro-computer stops electric power supply to the heating device for only a prescribed period of time during which the internal pressure of the pressure cavity drops to a predetermined value, from the point at which the prescribed amount of vapor or gas discharged from the pressure control valve is detected by the humidity sensor or gas sensor, and thereafter resumes electric power supply to the heating device at a reduced electric power supply ratio.

In an embodiment, the time required for the internal pressure of the pressure cavity to return nearly to atmospheric pressure, after the electric power supply to the heating device is stopped, is computed based upon the time required from the point at which the electric power supply to the heating device begins until the point at which the humidity sensor or gas sensor detects the prescribed amount of vapor or gas, and then the completion of heating is reported at the point at which said computed time has elapsed.

In an embodiment, the micro-computer has a counter means which calculates a specific time interval, and stops electric power supply to the heating device in the case where excess vapor or gas from the pressure control valve is not detected by the humidity sensor or gas sensor within said specific time interval.

Alternatively, the pressure cooker with sensors of the present invention comprises a pressure cavity which accommodates and seals up food; a pressure control valve provided in a portion of this pressure cavity; a heating chamber which accommodates the pressure cavity; a heating device combined with said heating chamber, said heating device heating the pressure cavity; a micro-computer which controls the electric power supply to this heating device; a humidity sensor, or gas sensor, which detects excess vapor discharged from the pressure control valve; and an input means for selecting the type of food, wherein said micro-computer detects only a prescribed amount of excess vapor or gas discharged from the pressure control valve using the humidity sensor or gas sensor, calculating the time required until that point, computes the time required until the prescribed amount of excess vapor has been directed, and then computes the remaining electric power supply time for the heating device based upon this calculated time and the type of food selected by the input means.

In an embodiment, the micro-computer reduces the electric power supply ratio to the heating device, from the point at which the humidity sensor, or gas sensor, detects the prescribed amount of excess vapor or gas discharged from the pressure control valve.

In an embodiment, the micro-computer stops an electric power supply to the heating device for only a prescribed period of time during which the internal pressure of the pressure cavity drops to a predetermined value, from the point at which the prescribed amount of vapor or gas discharged from the pressure control valve is detected by the humidity sensor or gas sensor, and thereafter resumes an electric power supply to the heating device at a reduced electric power supply ratio.

In an embodiment, the time required for the internal pressure of the pressure cavity to return nearly to atmospheric pressure, after the electric power supply to the heating device is stopped, is computed based upon the time required from the point at which the electric power supply to the heating device begins until the point at which the humidity sensor or gas sensor detects the prescribed amount of vapor or gas, and then the completion of heating is reported at the point at which said computed time has elapsed.

In an embodiment, the micro-computer has a counter means which calculates a specific time interval, and stops electric power supply to the heating device in the case where excess vapor or gas from the pressure control valve is not detected by the humidity sensor or gas sensor within said specific time interval.

Thus, the invention described herein makes possible the following objectives: (1) providing a pressure cooker with sensors that reliably detect the point at which the internal pressure of a pressure cavity reaches a prescribed value, and automatically control heating modes thereafter; (2) providing a pressure cooker with sensors that uses either a humidity sensor or a gas sensor to detect the internal pressure of the pressure cavity, instead of a thermal sensor; there is no leakage of generated vapor or gas etc. from the pressure cavity to the outside until the pressure control valve begins to operate, but when the internal pressure increases to the prescribed value, the pressure control valve operates and excess vapor or gas etc. is generously released outside of the cavity, so that, by detecting only the prescribed amount of this excess vapor or gas etc. which is released, using the humidity sensor or gas sensor, it is possible to reliably detect the point at which the internal pressure of the pressure cavity reaches the prescribed value; (3) providing a pressure cooker with sensors in which the pressure control valve begins to operate when the internal pressure of the pressure cavity reaches the prescribed value with the result which is equivalent to that of a direct measurement of the internal pressure with a pressure sensor; (4) providing a pressure cooker with a humidity sensor or gas sensor unlike a conventional pressure cooker with a pressure sensor that must be installed by penetrating the pressure cavity by which a measurement becomes possible without contacting the pressure cavity, and thus the pressure cavity is very easy to handle, and moreover, detection can be performed reliably because the object to be detected achieves an abrupt change which is digital in nature; (5) providing a pressure cooker with sensors in which a micro-computer calculates the time required from the start of heating to the point at which the humidity sensor or gas sensor detects operation of the pressure control valve, namely, the standby time; since such a calculated time depends strongly on the quantity of food, it becomes possible to judge the quantity of food from the calculated time, and at the point where the prescribed amount of vapor or gas is detected, a preset timer is put into operation, so that not only the electric power can be reduced, but the time required for the pressure mode can be automatically determined based upon the calculated time; (6) providing a pressure cooker with sensors in which the time required for the internal pressure of the pressure cavity to return to atmospheric pressure, after an electric power supply to the heating device is stopped, is also computed using this calculated time, and a heating completion report is performed at the point where this time has elapsed, so when the completion report is performed, high pressure no longer remains within the pressure cavity, so that it is possible to safely remove the pressure cavity; and (7) providing a pressure cooker with sensors, which is constructed so that an electric power supply to the heating device is stopped when vapor or gas is not detected within a prescribed time, making it possible to avoid the danger of internal pressure of the pressure cavity steadily increasing, even in the event of a malfunction such as non-operation of the pressure control valve for some reason, or failure of the sensors.

BRIEF DESCRIPTION OF THE DRAWINGS

This invention may be better understood and its numerous objects and advantages will become apparent to those skilled in the art by reference to the accompanying drawings as follows:

FIG. 4a is a chart showing the change of vapor detected by a humidity sensor used in the pressure cooker of the invention;

FIG. 4b is a chart showing the movement of the internal pressure of a pressure cavity in accordance with the charge of vapor shown in FIG. 4a;

FIG. 6b is a chart showing the movement of internal pressure of a pressure cavity in accordance with the charge of vapor shown in FIG. 6a;

FIG. 7 is a flow chart showing the operation of a micro-computer in the case of low pressure cooking such as that shown in FIG. 6a.

DESCRIPTION OF THE PREFERRED EMBODIMENTS

Example 1

Figure 1:
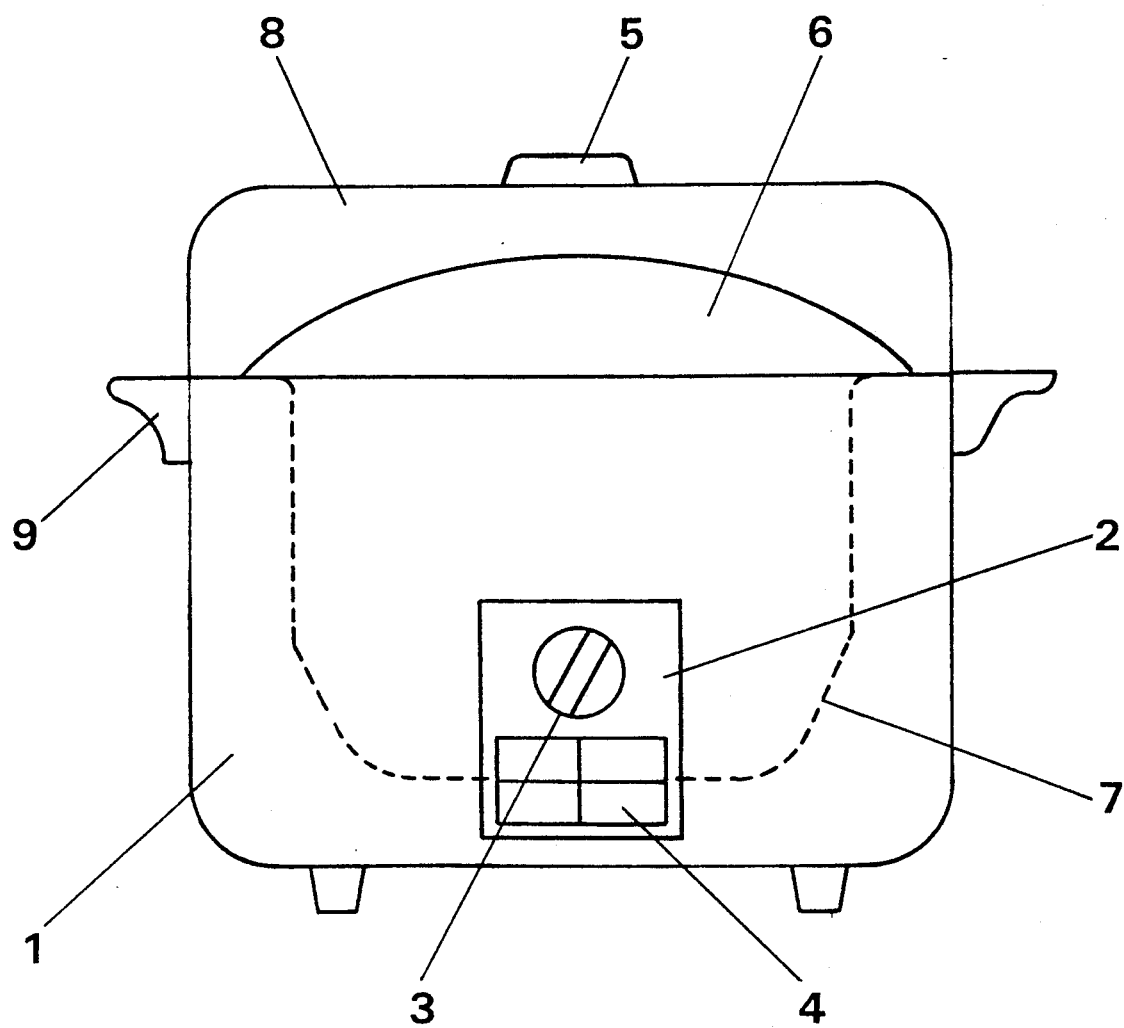
FIG. 1 is a perspective view showing the structure of the body of a pressure cooker of the invention.

FIG. 1 shows the body of a pressure cooker of the invention. There is an operating panel 2 on the front of the body 1, on which are disposed a timer knob 3, which is part of a timer means for setting a heating time for manual heating, and an auto-key 4 for selecting a heating mode according to factors such as the type of food and heating category for automatic heating.

A pressure control valve 5 is provided at the center of a lid 6 so that is can discharge excess vapor in order to maintain at a prescribed value the internal pressure of a pressure cavity 7, which is built-in to the body.

A lid handle 8 is constructed as a hollow cylinder-shaped body which is attached along a diameter of the lid 6. The pressure control valve 5 is engaged with a hole at the center of the lid handle 8. When the lid 6 is slid in a radial direction by grasping the lid handle 8, it is possible to seal the pressure cavity 7 with the lid 6. It is constructed so that the discharged vapor or gas etc. passes through the inside of the hollow of the lid handle 8 and is guided to a humidity sensor or gas sensor (not shown in FIG. 1, refer to FIG. 2) within the body 1. The reference numeral 9 is a handle for carrying the body 1.

Figure 2:
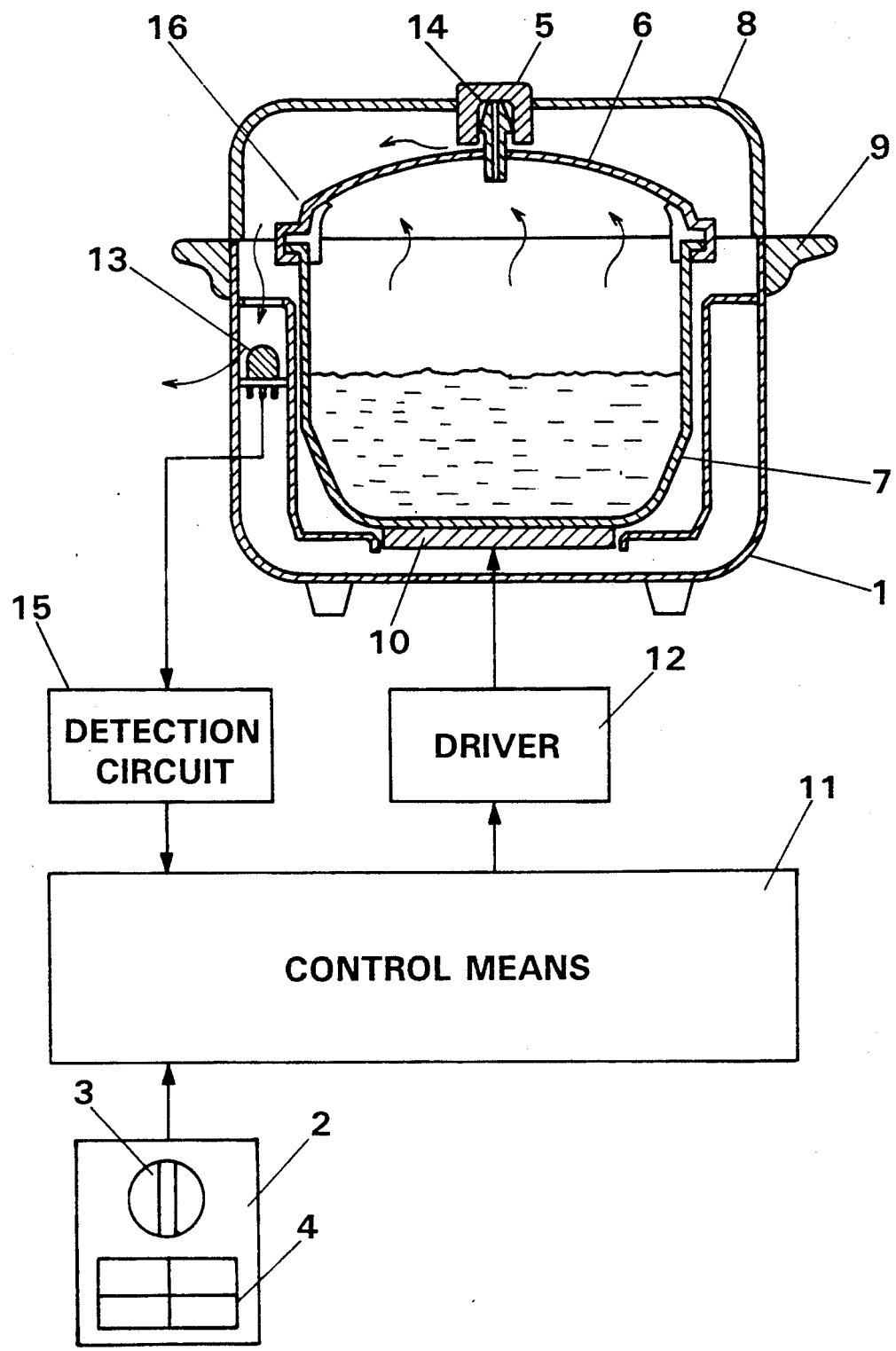
FIG. 2 is a block diagram of the pressure cooker of FIG. 1.

FIG. 2 is a block diagram showing the structure of the pressure cooker of the invention, in which an electric heater 10 is provided as a heating device at the bottom of the pressure cavity 7, and an electric power supply thereto is controlled by a micro-computer 11 via a driver 12.

The timer knob 3 and auto-key 4 on the operating panel 2 are connected to the micro-computer 11, and perform setting of the heating time and directions for the heating category, etc.

The humidity sensor or gas sensor 13 is disposed within a cowling passage formed by the lid handle 8 and body 1, and detects excess vapor or gas (indicated by arrows) which is discharged by the pressure control valve 5 through an opening in a nozzle 14. The reference numeral 15 is a detection circuit for the sensor.

Sensors such as a "Humiseramu" relative humidity sensor or "Neo-Humiseramu" absolute humidity sensor made by Matsushita Electric Industrial Co., Ltd., a gas sensor made by Figaro Co., an absolute humidity sensor made by Shibaura Denshi, a pyroelectric type vapor sensor made by Matsushita Electric Industrial Co., Ltd., or equivalents of these can be used for this kind of sensor. The reference numeral 16 is packing made of rubber for sealing the lid 6 and the pressure cavity 7.

Example 2

Figure 3:
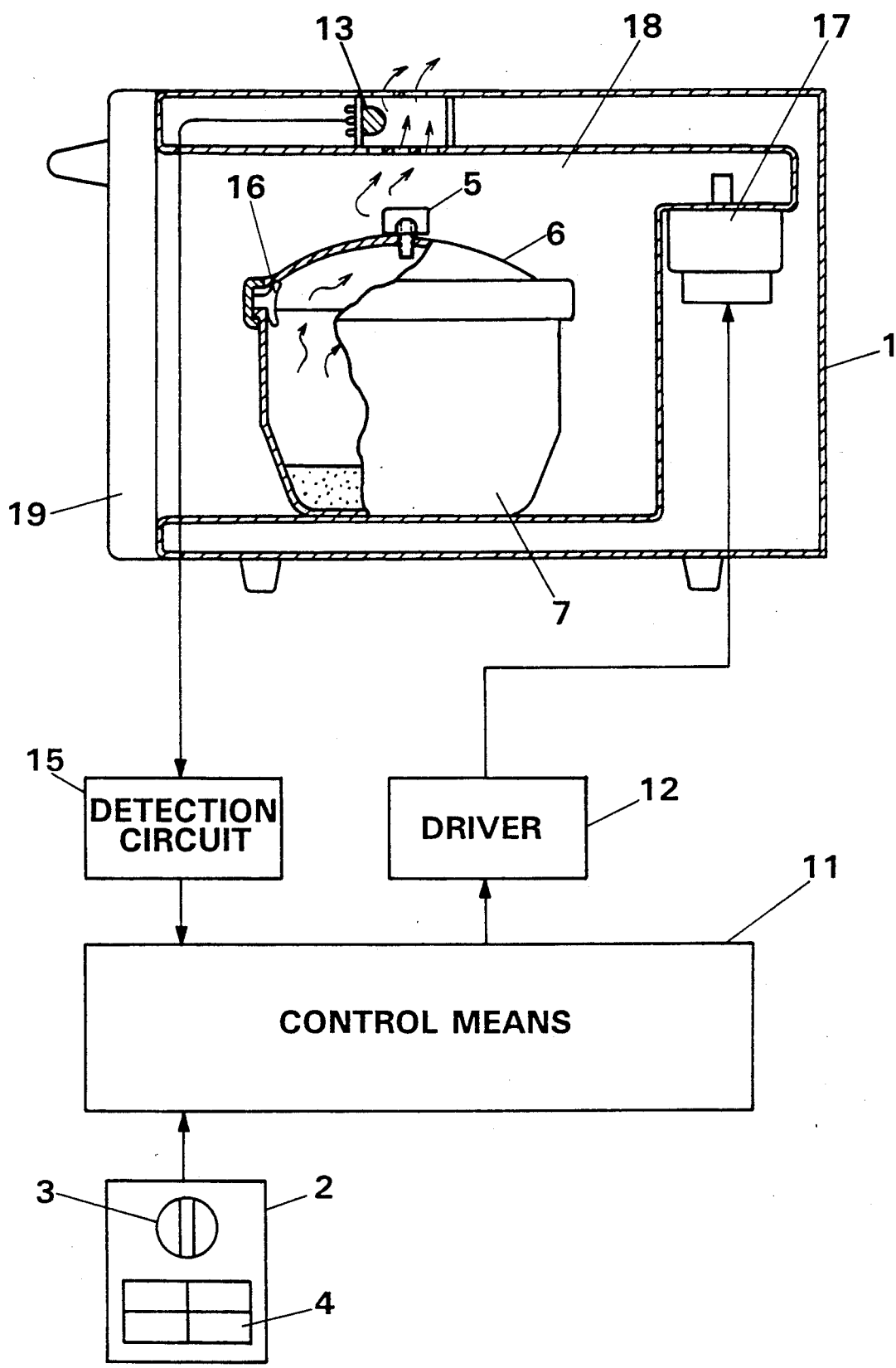
FIG. 3 is a block diagram showing the structure of another pressure cooker of the invention.

FIG. 3 is a block diagram showing the structure of another pressure cooker of the invention, in which a heating device is comprised of a magnetron 17, and a pressure cavity 7 made of a synthetic resin is disposed within a heating chamber 18. One side of the heating chamber 18 is blocked by a door 19 which can be opened and closed freely, and a humidity sensor 13 is disposed in a portion of the body 1 that communicates with the interior of the heating chamber 18.

The heating chamber 18 of this embodiment corresponds to the space formed by the body 1 and the lid handle 8 in Example 1 and when the pressure cavity 7 is removed, the heating chamber 18 can be used as a microwave oven.

Figure 4C:
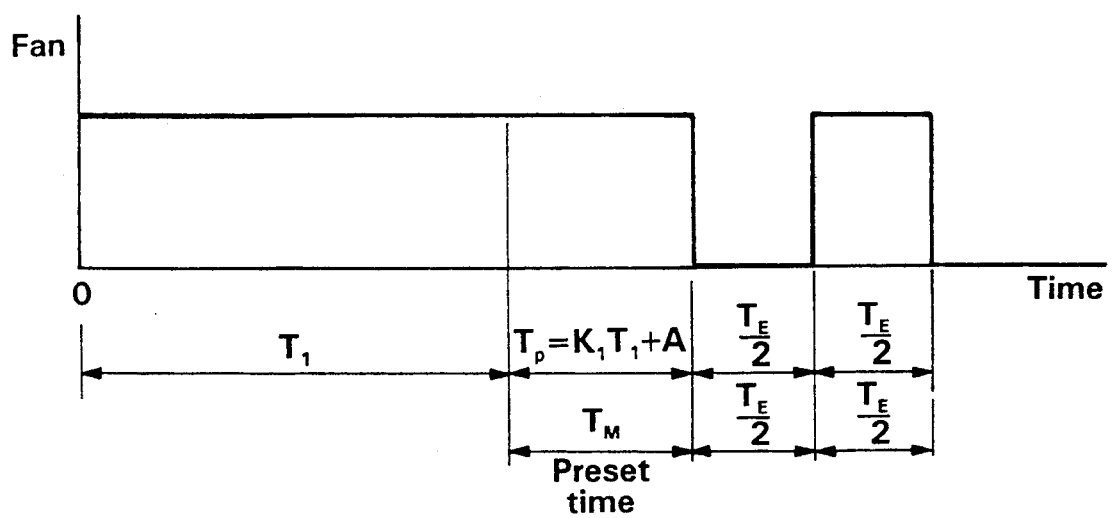
FIG. 4c is a chart showing the operation of a fan.

Next, an outline of the operation of this kind of control system is explained. FIG. 4 is time charts showing vapor in the vicinity of the humidity sensor and the internal pressure of the pressure cavity, wherein FIG. 4a indicates a change of vapor detected by the humidity sensor, FIG. 4b indicates a movement of the internal pressure in the pressure cavity, and FIG. 4c indicates the operation of a fan.

When heating is started, the temperature of food within the pressure cavity begins to rise, and the internal pressure begins to rise in the middle of the standby mode, as shown in FIG. 4b. However, as shown in FIG. 4a, vapor is not transmitted from the pressure cavity to the vicinity of the humidity sensor until the latter half of the standby mode, because the pressure control valve keeps the opening of the nozzle closed.

Next, when the pressure control valve begins to operate, which allows vapor to escape from the opening of the nozzle, humidity abruptly increases in the vicinity of the humidity sensor. This change is digital in nature, and thus the humidity sensor can detect point P with good sensitivity.

Differing from conventional methods which control a desired value as an absolute value using a thermal sensor, the method according to the invention can attain a stable detection because a relative control as to whether generated vapor is present or not is achieved. Moreoever, since the fact that internal pressure has reached a prescribed value is detected directly through the leakage of excess vapor from the pressure control valve, there is no delay of operation due to heat conduction such as that in conventional methods based upon a thermal sensor.

The micro-computer calculates the time $T_1$ required from the start of heating to the sensor's detection point P. The time $T_1$ depends upon the type and quantity of food, and is used to control the succeeding pressure mode and the escape mode.

In the case of manual heating, the timer means begins to operate from point P, and the preset time is counted down. This is the pressure mode, which has the greatest effect on the heating condition of the food. When the preset heating time has elapsed, an electric power supply to the heating device is stopped and it shifts to the escape mode, during which the internal pressure decreases. The time required for the escape mode is computed based upon the standby time $T_1$.

In a case of automatic heating, the pressure time is also determined based upon the standby time $T_1$, and the entire heating process, including the escape time, undergoes fully automatic control.

Table 1 shows part of the results from an experiment for a case of automatic heating. A 500 watt high frequency output magnetron was used as the heating device, and a pyroelectric type vapor sensor made by Matsushita Electric Industrial Co., Ltd. was used as the humidity sensor.

TABLE 1

| Food | Quantity | | | | | |
|---|---|---|---|---|---|---|
| | Small Quantity | | Standard | | Large Quantity | |
| | T1 | Escape | T1 | Escape | T1 | Escape |
| Unpolished Rice | 9 min | 9 min | 14 min | 14 min | 19 min | 19 min |
| Curry | 11 min | 12 min | 16 min | 17 min | — | — |
| Cooked Octopus | 8 min | 6 min | 13 min | 10 min | — | — |

From the results of this experiment, it can be seen that the detection time $T_1$ of the humidity sensor lengthens in a nearly linear fashion with an increase in the quantity of food. However, it can also be seen that this tendency differs subtly depending upon the type of food.

When the type of food is input into the micro-computer, the quantity of food can be inferred from the humidity sensor's detection time, that is, the time $T_1$ required for the standby mode, so that the succeeding pressure time can be automatically calculated based upon the value $T_1$.

That is, the pressure time Tp can be found by the following formula:

$$T_p = K_1 T_1 + A$$

wherein $K_1$ is a coefficient that is different depending upon the type of food, and A is a constant value.

Heating can be automatically completed using this kind of operation process. In this embodiment the pressure time was found with a linear expression, but a high order computation formula may also be used depending upon experimental results.

Moreover, from the results of this experiment, the escape mode also shows a tendency to become longer with an increase in the quantity of food, in the same way as the detection time $T_1$. This tendency also differs subtly depending upon the type of food.

When the type of food is input into the micro-computer, the quantity of food can be inferred from the humidity sensor's detection time, that is, the time $T_1$ required for the standby mode, so that the escape time can be automatically calculated based upon this value $T_1$.

That is, the escape time $T_E$ is found by the following formula:

$$T_E = K_2 T_1 + B$$

wherein $K_2$ is a coefficient that is different depending upon the type of food and B is a constant value.

The escape time required for the internal pressure of the heating chamber to return to a normal pressure is calculated using this kind of operation process, and thus heating can be automatically completed. In this embodiment the escape time was found using a linear expression, but a high order computation formula may also be used depending upon experimental results.

In the case of manual heating, escape mode times are also different, because different types of food are prepared and pressure times are set at the option of the person operating the pressure cavity. From the experimental results it can be seen that this escape mode time changes depending upon the total heating time of the food (detection time $T_1$+preset pressure time). Table 2 gives the experimental results for manual heating.

TABLE 2

| Food | Detection time | Case (A) | | Case (B) | |
|---|---|---|---|---|---|
| | | Present time | Escape time | Present time | Escape time |
| Meat loaf | 15 min | 5 min | 17 min | 8 min | 20 min |
| Beef stew | 16 min | 12 min | 23 min | 15 min | 26 min |

Accordingly, in the case of manual heating, the escape time can be automatically calculated based upon the preset pressure mode time and the humidity sensor's detection time.

That is, the escape time $T_E$ is found by the following formula:

$$T_E = K_3(T_1 + Tm) + C$$

wherein
$K_3$ is a coefficient that is different depending upon the type of food,
Tm is the timer's preset time, and
C is a constant value.

The escape time required for the internal pressure of the heating chamber to return to a normal pressure is calculated using this kind of operation process, and thus heating can be automatically completed. In this embodiment the escape time was found using a linear expression, but a high order computation formula may also be used depending upon experimental results.

Next, operation of the fan will be explained. During the first half of the escape mode, the internal pressure of the cavity is still sufficiently high for heating to proceed, even when the heating device is stopped. During this period, it is desirable to stop the fan, or reduce the air capacity, in order to effectively utilize this energy. During the latter half of the escape mode, where the temperature within the cavity has already dropped and no further heating proceeds, the escape time can be rather shortened by active cooling. In this embodiment, the fan is stopped during the first half of the escape mode ($\frac{1}{2}$ of the escape time $T_E$), and the fan is operated during the second half ($\frac{1}{2}$ of the escape time $T_E$) in order to shorten the time.

Figure 5:
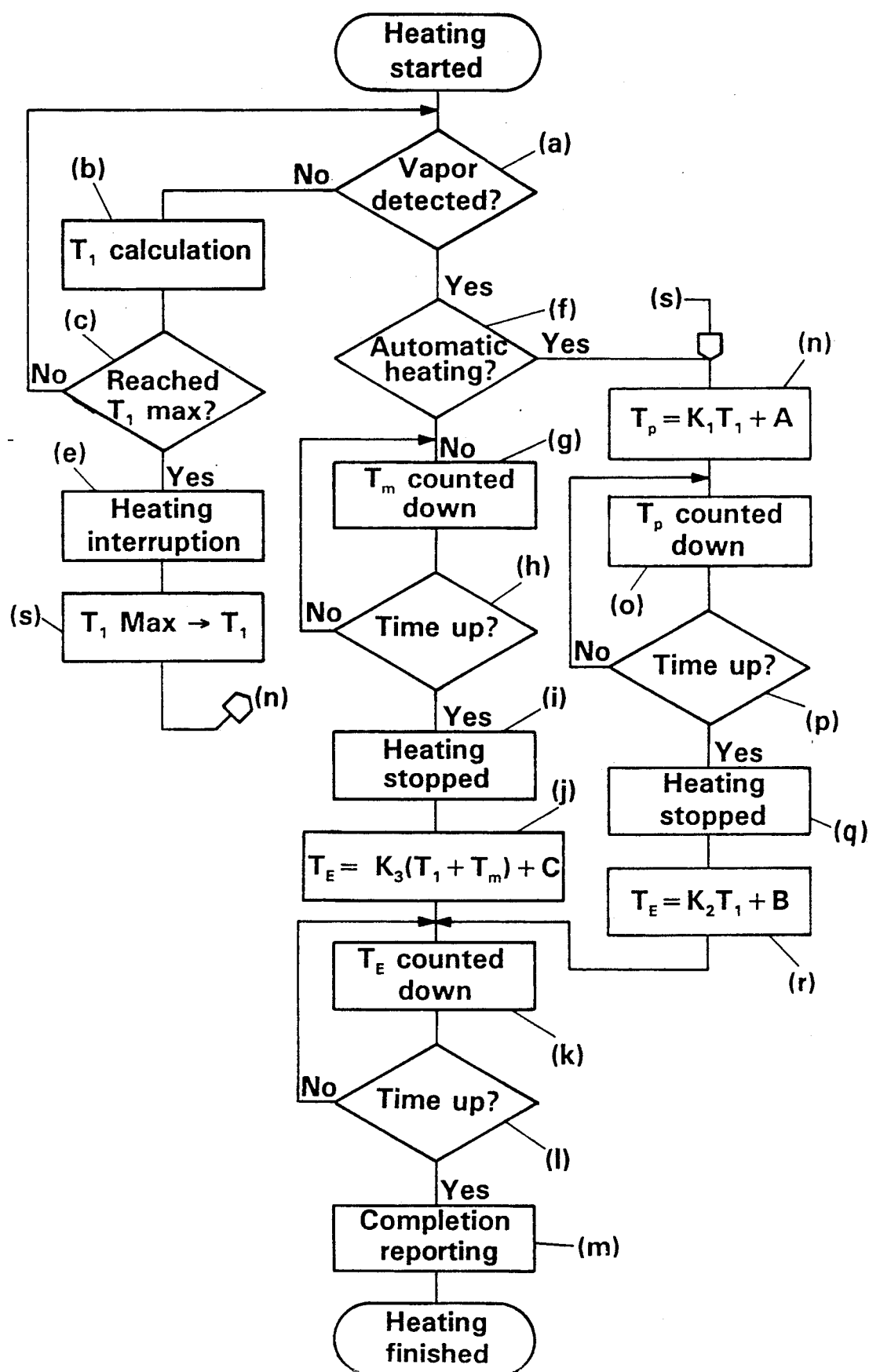
FIG. 5 is a flow chart showing the operation of a micro-computer.

FIG. 5 is a flow chart showing the operation of this kind of micro-computer.

When heating is started, it is first checked whether or not a prescribed quantity of vapor has been detected by the humidity sensor (a), and until this is detected, the standby time $T_1$ is calculated (b). It also checks whether or not this time $T_1$ has reached a certain maximum value, $T_1$max (c).

This is a consideration for greater safety in the case where the pressure control valve does not operate for some reason, such as clogging due to food residue, or in case that detection becomes impossible, regardless of the discharge of vapor from the pressure cavity, for some reason such as a malfunction of the sensor or detection circuit. The former problem in particular may occur even in normal use, and if heating is continued in this condition, the internal pressure of the pressure cavity will steadily increase, resulting in danger. Safety devices are generally installed in this kind of pressure cavity, but the invention is constructed so as to further ensure safety through the interruption of heating in this kind of situation (e).

In the case of automatic heating when the capacity of the pressure cavity is determined, a maximum value is obtained for the detection time for a maximum quantity according to the type of food, and therefore $T_1$max can be determined based upon this. In a case of manual heating, various foods are heated, but by ascertaining the kind and quantity of food which will result in the maximum detection time among the expected foods, $T_1$max can be determined based upon this. When this time is exceeded with no detection by the sensor, it is judged that something abnormal has occurred.

Then, when the prescribed amount of vapor is detected in due course (a), it is next determined whether it is automatic heating or manual heating (f).

In the case of manual heating, the heating time set in the timer is counted down (g). When the heating time has elapsed (h), heating is stopped (i), and it shifts to the escape mode. In the escape mode, the calculated detection time $T_1$ and the time Tm set in the timer are multiplied by the fixed coefficient $K_3$, and the escape time $T_E = K_3(T_1 + A) + D$ is computed (j). Then this time $T_E$ is counted (k), and when the time is up (l), the escape mode finishes and completion is reported (m), and heating is finished.

In the case of automatic heating, the detection time $T_1$ is multiplied by the fixed constant $K_1$ corresponding to the selected auto-key, and the pressure time $Tp = K_1T_1 + A$ is computed (n). Then this time Tp is counted (o). When this pressure time Tp has elapsed (p), heating is stopped (q), and it shifts to the escape mode. In the escape mode, the detection time $T_1$ is multiplied by the fixed coefficient $K_2$ corresponding to the auto-key which has been selected, and the escape time $T_E = K_2T_1 + B$ is computed (r). Then this time $T_E$ is counted (k), and when the time is up (l), completion is reported (m) in the same way as for manual heating.

Now heating modes will be explained in the case where humidity detection does not take place within the prescribed time, due to a problem such as defects of the sensor. In this case, it can be imagined that the internal pressure of the pressure cavity further exceeds the prescribed value and increases to an abnormally high level, so that it would be all the more dangerous to immediately perform the completion report. Accordingly, the invention is constructed so that after heating is interrupted (e), $T_1$max is treated as $T_1$ (s), and then the pressure time Tp is computed (n). The process thereafter is the same as that in the case of automatic heating. However, an electric power supply to the heating device is not being performed while the pressure time is being counted, because heating has already been interrupted (e), and a mode similar to the escape mode comes into operation. The succeeding escape mode is also implemented treating $T_1$max as $T_1$, which results in the pressure cavity being left standing for a longer time than usual, and even assuming that the internal pressure has risen abnormally high, it will completely drop to approximately atmospheric pressure during this time. Therefore, the pressure cavity can be safely removed from the heating chamber at the time when the completion report is performed.

Depending upon the type of food, there are many cases in which it is best to reduce the pressure during the pressure mode. For example, high pressure is preferable for tough meat or fish, when it is desired to cook until the bones become softened, where the internal pressure is generally set at about twice the atmospheric pressure, but when cooking foods such as polished rice or vegetables, applying a high pressure of as much as twice the atmospheric pressure will result in overcooking which frequently causes breakdown and discoloration, etc. Accordingly, in cooking these foods it is best to select a somewhat lower internal pressure of about 1.2 to 1.6 times the atmospheric pressure.

In conventional pressure cookers, it is most common to carry out such a pressure change by changing the weight of the pressure control valve. In other words, a plurality of weights are provided from which a lighter one is set into place. Therefore, operation is troublesome and the weights can be easily lost, making its use rather impractical.

In the invention, this kind of low pressure cooking does not involve changing the weights of the pressure control valve, but rather can be performed by fixing the weight at the heaviest level and controlling an electric power supply to the heating device.

Figure 6A:
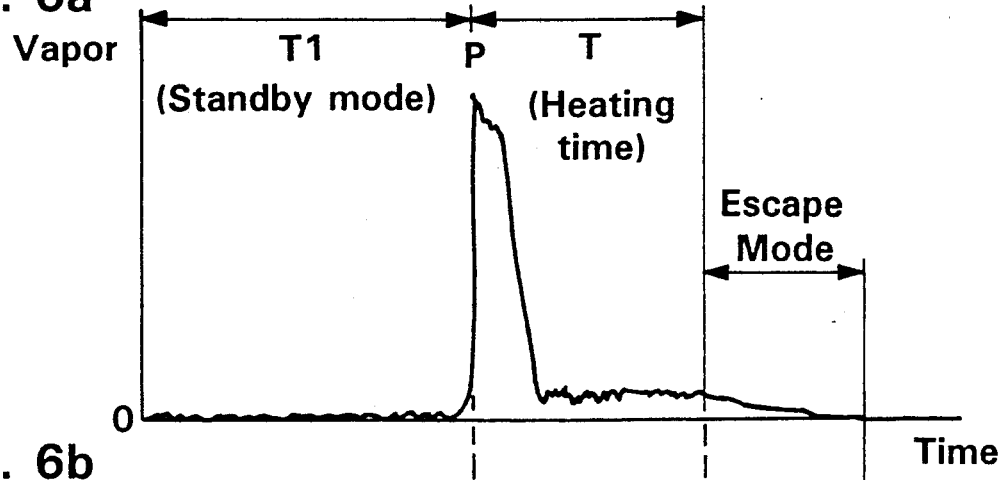
FIG. 6a is a chart showing the change of vapor detected by a humidity sensor in a case of low pressure cooking.
Figure 6B:
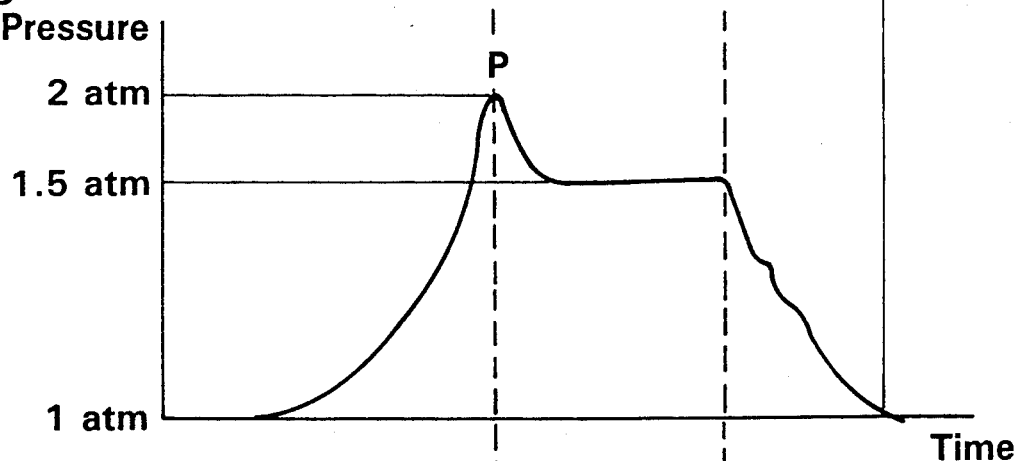
Figure 6C:
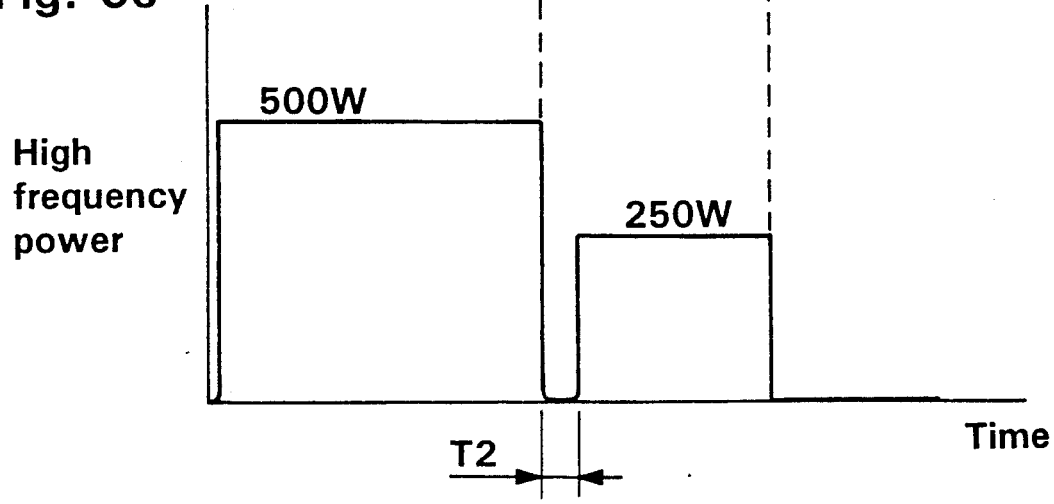
FIG. 6c is a chart showing the condition of the electric power supply to a heating device.

FIG. 6 is charts showing conditions in this kind of control, wherein FIG. 6a is a chart showing the change of vapor detected by the humidity sensor in such a case of low pressure cooking; FIG. 6b is a chart showing the movement of the internal pressure of the pressure cavity at this time; and FIG. 6c is a chart showing the condition of an electric power supply to the heating device.

When the prescribed amount of vapor is detected by the humidity sensor and point P is reached (FIG. 6a), the internal pressure of the pressure cavity reaches 2 times the atmospheric pressure (FIG. 6b), and then the electric power supply to the heating device is quickly stopped (FIG. 6c). This stoppage is also continued during the time $T_2$.

The time $T_2$, during which electric power supply to the heating device is stopped, is found by the following formula.

$$T_2 = K_4T_1 + D$$

wherein $K_4$ is a coefficient that is different depending upon the type of food and D is a constant value.

Then after this stoppage, electric power supply to the heating device is resumed at a lower power $P_2$ (in the example illustrated, 500 W initially, 250 W when resumed) (FIG. 6c). Through this kind of control, the internal pressure first drops, and thereafter it is possible to maintain a constant pressure (in the example illustrated, 1.5 times the atmospheric pressure) (FIG. 6b).

The time $T_3$, for the electric power supply to the heating device after resumption, is found by the following formula.

$$T_3 = K_5 T_1 + E$$

wherein
$K_5$ is a coefficient that is different depending upon the type of food and
E is a constant value.

By adjusting these times $T_2$ and $T_3$, and the resumption power $P_2$, the desired internal pressure can be obtained.

Figure 7:
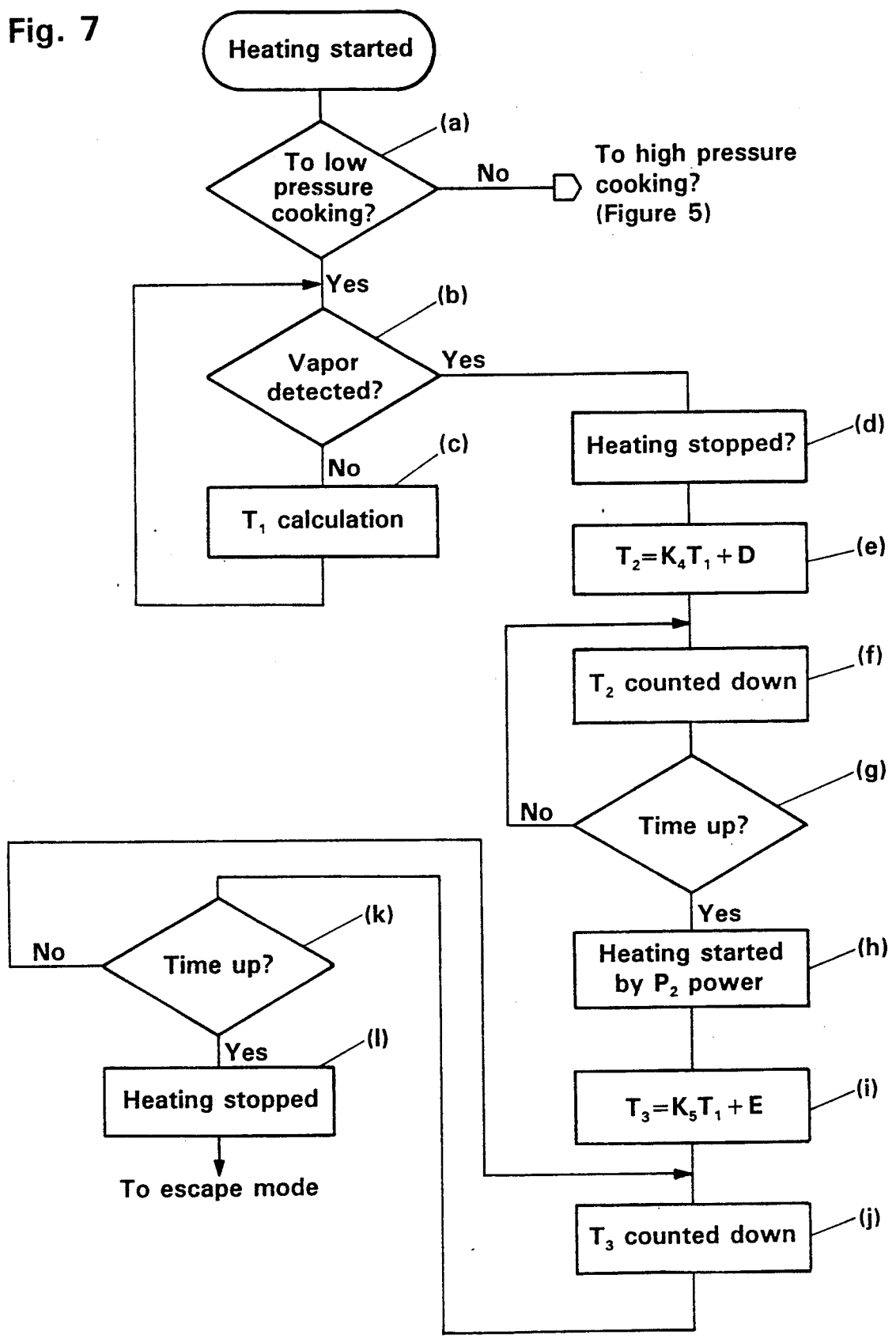

FIG. 7 is a flow chart showing the operation of the micro-computer in such a case of low pressure cooking.

First, when the auto-key is depressed, it is determined whether low pressure cooking has been selected for vegetables or cooked rice, etc., or high pressure cooking has been selected for meat or fish, etc. (a). An example of control for high pressure cooking is as shown in FIG. 5. In the case of low pressure cooking, humidity detection is performed in the same way as for high pressure cooking (b), and the standby time $T_1$ is calculated (c). When the point of humidity detection is reached, heating is stopped (d), and the stoppage time $T_2 = K_4 T_1 + D$ is computed (e). This time $T_2$ is counted down (f), and when the time is up (g), heating is resumed at the lower power $P_2$ (h). Then, a heating time $T_3 = K_5 T_1 + E$ is computed (i). This time $T_3$ is counted (j), and when the time is up (k), heating is stopped (l) and it shifts to an escape mode. Since the escape mode is the same as that in the example of high pressure cooking in FIG. 5, this is omitted.

As mentioned above, in the case where a timer is operated with a pressure cooker of the invention, a direct and reliable detection is possible at the point where a pressure control valve begins to operate, by detecting excess vapor or gas which is discharged from the pressure control valve using a humidity sensor. The results obtained are nearly equivalent to those of direct measurement of the internal pressure using a pressure sensor, and thus it is possible to operate a timer means without a delay. Moreover, although a conventional pressure sensor must be installed by penetrating the pressure cavity, with a humidity sensor or gas sensor of the invention, measurement becomes possible without contacting the pressure cavity, and thus the pressure cavity is very easy to handle. Moreover, detection can be performed reliably because the object to be detected achieves an abrupt change which is digital in nature.

Moreover, the standby time, required from the start of heating until the point where the pressure control valve begins to operate by means of the humidity sensor or gas sensor, strongly depends upon the quantity of food, and hence it is possible to automatically determine the pressure time and escape time based upon this. Therefore, operations such as setting of a pressure time or waiting time for the escape mode become completely unnecessary. Moreover when completion is reported, high pressure no longer remains in the pressure cavity, making it possible to safely remove the pressure cavity.

Furthermore, the invention is constructed so that the electric power supply to the heating device is stopped when vapor or gas is not detected within a prescribed time, making it possible to avoid the danger of internal pressure of the pressure cavity steadily increasing, even in the event of a malfunction such as non-operation of the pressure control valve for some reason, or defects of the sensors.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A pressure cooker with sensors comprising:
   a pressure cavity which accommodates and seals up food;
   a pressure control valve provided in a portion of this pressure cavity;
   a heating chamber which accommodates the pressure cavity;
   a heating device combined with said heating chamber, said heating device heating the pressure cavity;
   a micro-computer which controls an electric power supply to said heating device;
   a humidity sensor, or gas sensor, which detects excess vapor discharged from the pressure control valve; and
   a timer means which sets a heating time for the period after the prescribed pressure is reached within the pressure cavity,
   wherein said micro-computer starts said timer means by detecting only a prescribed amount of excess vapor or gas discharged from said pressure control valve using said humidity sensor or gas sensor.

2. A pressure cooker according to claim 1, wherein the micro-computer reduces the electric power supply ratio to the heating device, from the point at which the humidity sensor, or gas sensor, detects the prescribed amount of excess vapor or gas discharged from the pressure control valve.

3. A pressure cooker according to claim 1, wherein the micro-computer stops an electric power supply to the heating device for only a prescribed period of time during which the internal pressure of the pressure cavity drops to a predetermined value, from the point at which the prescribed amount of vapor or gas discharged from the pressure control valve is detected by the humidity sensor or gas sensor, and thereafter resumes the electric power supply to the heating device at a reduced electric power supply ratio.

4. A pressure cooker according to claim 1, wherein the time required for the internal pressure of the pressure cavity to return nearly to atmospheric pressure, after the electric power supply to the heating device is stopped, is computed based upon the time required from the point at which the electric power supply to the heating device begins until the point at which the humidity sensor or gas sensor detects the prescribed amount of vapor or gas, and then the completion of heating is reported at the point at which said computed time has elapsed.

5. A pressure cooker according to claim 1, wherein the micro-computer has a counter means which calculates a specific time interval, and stops an electric power supply to the heating device in the case that excess vapor or gas from the pressure control valve is not detected by the humidity sensor or gas sensor within said specific time interval.

6. A pressure cooker with sensors comprising:
   a pressure cavity which accommodates and seals up food;
   a pressure control valve provided in a portion of this pressure cavity;
   a heating chamber which accommodates the pressure cavity;
   a heating device combined with said heating chamber, said heating device heating the pressure cavity;
   a micro-computer which controls the electric power supply to this heating device;
   a humidity sensor, or gas sensor, which detects excess vapor discharged from the pressure control valve; and
   an input means for dictating the type of food,
   wherein said micro-computer detects only a prescribed amount of excess vapor or gas discharged from the pressure control valve using the humidity sensor or gas sensor, calculating the time required until that point, computes the time requires until the prescribed amount of excess vapor has been detected, and then computes the remaining electric power supply time for the heating device based upon this calculated time and the type of food dictated by the input means.

7. A pressure cooker according to claim 6, wherein the micro-computer reduces the electric power supply ratio to the heating device, from the point at which the humidity sensor, or gas sensor, detects the prescribed amount of excess vapor or gas discharged from the pressure control valve.

8. A pressure cooker according to claim 6, wherein the micro-computer stops an electric power supply to the heating device for only a prescribed period of time during which the internal pressure of the pressure cavity drops to a predetermined value, from the point at which the prescribed amount of vapor or gas discharged from the pressure control valve is detected by the humidity sensor or gas sensor, and thereafter resumes an electric power supply to the heating device at a reduced electric power supply ratio.

9. A pressure cooker according to claim 6, wherein the time required for the internal pressure of the pressure cavity to return nearly to atmospheric pressure, after the electric power supply to the heating device is stopped, is computed based upon the time required from the point at which the electric power supply to the heating device begins until the point at which the humidity sensor or gas sensor detects the prescribed amount of vapor or gas, and then the completion of heating is reported at the point at which said computed time has elapsed.

10. A pressure cooker according to claim 6, wherein the micro-computer has a counter means which calculates a specific time interval, and stops an electric power supply to the heating device in the case where excess vapor or gas from the pressure control valve is not detected by the humidity sensor or gas sensor within said specific time interval.

* * * * *